(12) United States Patent
Belanger et al.

(10) Patent No.: US 7,881,324 B2
(45) Date of Patent: Feb. 1, 2011

(54) STEERING DATA COMMUNICATIONS PACKETS FOR TRANSPARENT BUMP-IN-THE-WIRE PROCESSING AMONG MULTIPLE DATA PROCESSING APPLICATIONS

(75) Inventors: Matthew T. Belanger, Holly Springs, NC (US); Brahmanand K. Gorti, Cary, NC (US); John Lloyd, Durham, NC (US); Gary R. Shippy, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 12/410,803

(22) Filed: Mar. 25, 2009

(65) Prior Publication Data

US 2010/0246593 A1    Sep. 30, 2010

(51) Int. Cl.
*H04L 12/28* (2006.01)
(52) U.S. Cl. .................. 370/419; 370/229; 370/390; 370/395.51; 370/401
(58) Field of Classification Search .............. 370/229, 370/230, 351, 389, 390, 395.51, 395.52, 370/401, 419, 474, 476
See application file for complete search history.

(56) References Cited

U.S. PATENT DOCUMENTS

| | | | |
|---|---|---|---|
| 6,854,015 | B2 | 2/2005 | McCormack et al. |
| 6,950,394 | B1 * | 9/2005 | Chou et al. ................. 370/229 |
| 7,142,564 | B1 * | 11/2006 | Parruck et al. .............. 370/474 |
| 7,180,899 | B2 | 2/2007 | De Silva et al. |
| 7,245,620 | B2 | 7/2007 | Shankar |
| 7,283,538 | B2 | 10/2007 | Pham et al. |
| 7,310,306 | B1 | 12/2007 | Cheriton |
| 7,369,574 | B1 | 5/2008 | Parruck et al. |
| 7,697,525 | B2 * | 4/2010 | Zelig et al. ................. 370/390 |

(Continued)

FOREIGN PATENT DOCUMENTS

WO    WO 03/103237 A1    12/2003

OTHER PUBLICATIONS

Chiussi, et al.; A Family of ASIC Devices For Next Generation Distributed Packet Switches With QoS Support for IP And ATM; 2001; pp. 145-149; IEEE; Holmdel, NJ, USA.

(Continued)

*Primary Examiner*—Ayaz R Sheikh
*Assistant Examiner*—Andrew C Lee
(74) *Attorney, Agent, or Firm*—H. Barrett Spraggins; Cynthia G. Seal; Biggers & Ohanian, LLP.

(57) ABSTRACT

Steering data communications packets for transparent, bump-in-the-wire processing among multiple data processing applications in a link-level data communications switch, the switch including data communications ports, a port connected to a first data communications network and another port connected to a second data communications network, other ports connected to the data processing applications, the switch also including rules governing the steering, including receiving in the switch from the first network data communications packets directed to the second network, each packet containing a source network address and a destination network address and steering by the switch each packet among the applications and through an egress port, such steering carried out only in accordance with the rules, using neither the source network address of the packet, the destination network address of the packet, nor any link-level identifier of any application.

15 Claims, 5 Drawing Sheets

U.S. PATENT DOCUMENTS

| | | |
|---|---|---|
| 2003/0223361 A1 | 12/2003 | Hussain et al. |
| 2005/0100011 A1 | 5/2005 | Chiruvolu et al. |
| 2005/0201400 A1 | 9/2005 | Park et al. |
| 2005/0265248 A1 | 12/2005 | Gallatin et al. |
| 2007/0223372 A1 | 9/2007 | Haalen et al. |
| 2007/0280258 A1 | 12/2007 | Rajagopalan et al. |
| 2007/0288615 A1 | 12/2007 | Keohane et al. |
| 2008/0031129 A1 | 2/2008 | Arseneault et al. |
| 2008/0112400 A1 | 5/2008 | Dunbar et al. |
| 2008/0216074 A1 * | 9/2008 | Hass et al. ............... 718/100 |
| 2009/0003317 A1 | 1/2009 | Kasralikar et al. |

OTHER PUBLICATIONS

Salyers, et al.; Improving Network Efficiency; PhD Candidacy Proposal.

PCT Search Report, May 10, 2010; PCT Application No. PCT/EP2010/052749.

U.S. Appl. No. 12/467,367, filed May 18, 2009, Belanger, et al.

U.S. Appl. No. 12/472,987, filed May 27, 2009, Belanger, et al.

U.S Appl. No. 12/481,678, filed Jun. 10, 2009, Belanger, et al.

* cited by examiner

STEERING DATA COMMUNICATIONS PACKETS FOR TRANSPARENT BUMP-IN-THE-WIRE PROCESSING AMONG MULTIPLE DATA PROCESSING APPLICATIONS

BACKGROUND OF THE INVENTION

1. Field of the Invention

The field of the invention is data processing, or, more specifically, methods, apparatus, and products for steering data communications packets for transparent, bump-in-the-wire processing among multiple data processing applications.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer architectures have evolved to take advantage of the higher performance of the hardware, resulting in computer systems today that are much more powerful than just a few years ago.

One of the areas that has seen substantial improvement is data communications through packet switching. Today many systems provide processing of data communications packets that is transparent to the operations of the source computer, the sender, and the destination of the packets. That is, neither the source nor the ultimate destination of the packets is ever made aware that such transparent processing occurs. Such transparent processing may include for example security processing, load balancing functions among data communications equipment, statistical surveys, and so on. Such transparent processing can include processing by not just one, but several interim applications, one providing security services, another performing statistical surveys, another performing load balancing, and so on.

When data packets are to be processed by several applications the problem of routing the data stream from one application to another naturally arises. For typical applications this routing function is solved by leveraging the standard ISO/OSI routing and switching model whereby packet headers are modified along the path and the payload is delivered to the application. For packet analysis and processing applications that typically operate in 'bump-in-the-wire promiscuous mode,' that is, transparently and invisibly sitting between two or more networking devices listening to all packets exchanged between the devices, preserving the packet headers is required. Because these applications commonly perform inspection on the packet headers and the payload, the entire packet—payload+headers—must be considered "payload" to this kind of application. Each such bump-in-the-wire application must return each packet it handles to the communications system with the original header addresses intact so as not to interfere with the overall transmission of the packet from its original source to its ultimate destination.

Prior art has attempted to solve this problem by encapsulating the entire packet—payload+headers—and wrapping it with a new header that specifies the routing of the packet to bump-in-the-wire applications. This new encapsulation header must be understood by all the various hardware, switches, NICs, and so on, and potentially even the bump-in-the-wire applications in the sequence. This requirement to process this additional layer of headers is a burden to hardware developers and application providers who must now design, develop, test, and support an additional configuration of their core product. In addition, some solutions require that application providers not only integrate new header processing, but also port their application to specific hardware and operating system platforms.

Another solution attempted in prior art was to modify packets in certain ways, such as changing the destination MAC address, for example. This option changes the packet and limits the ability to perform the types of analysis that rely on possession of the original addresses in the packet. Moreover, this solution requires hardware developers to provide additional modifications of routers, bridges, and switches that use it to track the original addresses and return them to the packets upon return from the bump-in-the-wire applications.

SUMMARY OF THE INVENTION

Methods, apparatus, and products are disclosed for steering data communications packets for transparent, bump-in-the-wire processing among multiple data processing applications, such steering carried out in a link-level data communications switch, the switch typically including a data communications processor operatively coupled to a plurality of data communications ports, a first one of the ports connected to a first data communications network and a second one of the ports connected to a second data communications network, two or more additional ports connected to the data processing applications, each port capable of functioning as an ingress port or an egress port for data communications among the networks and the applications, each application associated with a unique, link-level identifier; the switch typically also including data storage operatively coupled to the processor, the data storage having stored within it rules governing the steering of data communications among the ports of the switch, each rule comprising an association of an ingress port and an egress port; further including receiving in the switch through an ingress port from the first network data communications packets directed to the second network, each packet containing a source network address that identifies the source of the packet in the first network and a destination network address that identifies the destination of the packet in the second network and steering by the switch each packet among the applications and through an egress port to the second network, such steering carried out only in accordance with the rules, using neither the source network address of the packet, the destination network address of the packet, nor the link-level identifier of any application.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
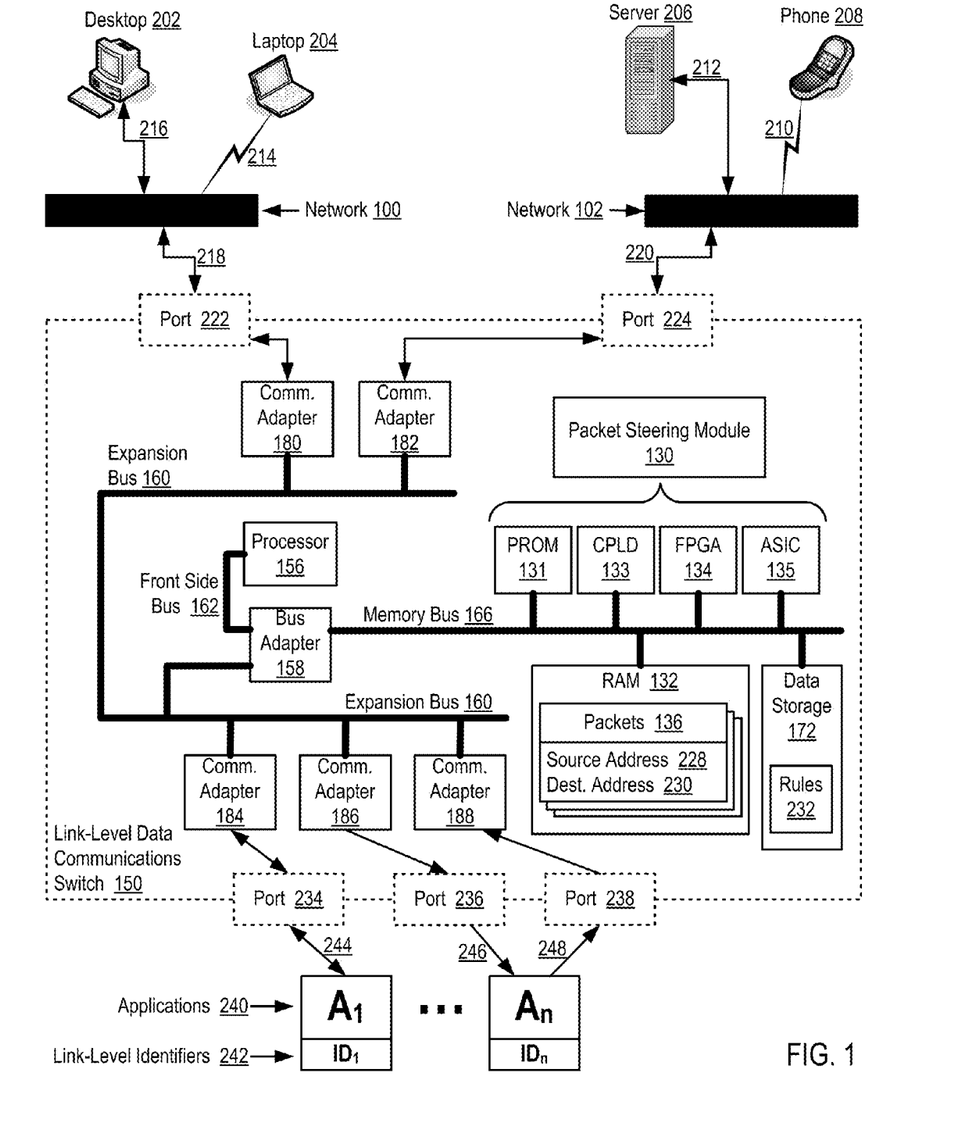
FIG. 1 sets forth a functional block diagram of automated computing machinery, example automated apparatus for steering data communications packets for transparent, bump-in-the-wire processing among multiple data processing applications according to embodiments of the present invention.

Example methods, apparatus, and products for steering data communications packets for transparent, bump-in-the-wire processing among multiple data processing applications in accordance with the present invention are described with reference to the accompanying drawings, beginning with FIG. 1. FIG. 1 sets forth a functional block diagram of automated computing machinery, example automated apparatus for steering data communications packets for transparent, bump-in-the-wire processing among multiple data processing applications according to embodiments of the present invention. The example apparatus of FIG. 1 includes two data communications networks (100, 102), each of which is composed of data communications routers or switches (not shown) that connect other computing devices that represent sources and destinations of data communications. Network (100) connects a desktop computer (202) through a wireline connection (216) and a laptop computer (204) through a wireless connection (214). Network (102) connects a server (206) through a wireline connection (212) and a mobile phone (208) through a wireless connection (210). The number and type of connected source and destination devices in this example is selected only for ease of explanation. Readers will recognize that in fact a very large number of devices, as well as many different types of devices, can be connected to any network for purposes of packet steering according to embodiments of the present invention.

The example apparatus of FIG. 1 includes a link-level data communications switch (150) that carries out the actual packet steering among bump-in-the-wire applications. The switch (150) is a device of the kind sometimes referred to as a bridge, an n-port bridge, a layer-2 switch, a smart switch, or just a 'switch.' Within the scope of the present invention, any link-level switch having a sufficient number of ports sufficient to support the number of bump-in-the-wire applications through which packets are to be steered can be improved to carry out packet steering according to embodiments of the present invention, including in particular ordinary Ethernet switches. In many embodiments, however, switches that are improved for packet steering according to embodiments of the present invention will be fabric-type switches, Fibre Channel switches, Infiniband switches, Ethernet Fabric switches, and so on.

The terms 'link-lever' and 'layer-2' both refer to the data link layer of the Open Systems Interconnection Reference Model ('OSI Model'). The data link layer is often referred to in this specification as the 'link layer' or the 'link level.' The first, third, and fourth layers of the OSI Model, also pertinent to this discussion, are the Physical Layer, the Network Layer, and the Transport Layer respectively. The Physical Layer of the OSI Model defines the electrical and physical specifications for data communications devices, typically devices connected in effect to a local area network or 'LAN.' Layer 3 or the Network Layer of the OSI Model provides functional and procedural means of transferring variable length data sequences from a source to a destination via one or more networks, generally including routing functions. The Network Layer is implemented with routers that communicate with one another according to data communications protocols. The well known Internet Protocol ('IP') operates generally as an OSI Network Layer data communications protocol. In fact, although IP is definitely not the only Network Layer protocol, IP is so ubiquitous at this point in time as to be almost a synonym for Network Layer functionality. Examples of other layer 3 protocols include ICMP, IGMP, and IPsec. The Transport Layer provides reliable data transfer services to the other layers. The Transport Layer controls the reliability of a given link through flow control as well as segmentation and desegmentation of packets. Transport Layer protocols are typically connection oriented. By far the most common examples of Transport Layer protocols are the Transmission Control Protocol ('TCP') and the User Datagram Protocol ('UDP'). Examples of other layer 4 protocols include DCCP, SCTP, RSVP, and ECN.

The data link layer of the OSI Model is implemented with switches that communicate with one another according to link layer data communications protocols. Like IP in the network layer, the Ethernet protocol, not the only link-level protocol, nevertheless is so ubiquitous as to be almost synonymous with the link layer. Examples of other link-level protocols include ARP, RARP, NDP, OSPF, and L2TP. Link-level switches connect to other devices, typically on a LAN, through connections referred to as 'ports.' Ports can be implemented as wireless connections as well as wireline connections. Each wireline port is made up of the connectors, interconnections, electrical or optical conductors, and so on, as required to effect connections from the switch to other devices, such other devices including, for example, computers on a LAN, other switches, routers, and so on. Wireless ports may include antennas, amplifiers, other radio components, and the like, as needed to effect wireless communications between a switch and other devices. A switch receives data communications in data units referred to as 'packets.' It is common in the art to refer to link layer data units as 'frames,' but this specification uses the slightly more descriptive term 'packets.' In this specification, the term 'packet' refers to all data units in data communications, including units travelling in the physical layer, in the network layer, and in other layers as well.

The switch (150) of FIG. 1 includes at least one data communications processor (156) as well as random access memory (132) ('RAM') which is connected through a high speed memory bus (166) and bus adapter (158) to processor (156) and to other components of the switch (150). The data communications processor (156) is also operatively coupled through an expansion bus (160) to a number of data communications ports (222, 224, 234, 236, 238). The data communications processor can be implemented as any of a variety of computer microprocessors or microcontrollers including, for example, a Motorola 68000™, an IBM POWER™ architecture processor, an Intel Pentium™, and so on. The processor (156) in this example is coupled to the ports through an expansion bus (160) and several communications adapters (180, 182, 184, 186, 188). The communications adapters implement data communications through the ports with other switches, routers, networks, computers, and applications running on other computers. Such communications are so often networked that a communications adapter is often referred to as a 'network interface card' or 'NIC.' Communications adapters implement the hardware level of data communications through which one computer, router, or switch sends data communications to another computer, router, or switch, directly or through a data communications network.

Examples of communications adapters useful for [preamble] according to embodiments of the present invention include modems for wired dial-up communications, Ethernet (IEEE 802.3) adapters for wired data communications network communications, and 802.11 adapters for wireless data communications network communications.

In the example of FIG. 1, a first one of the ports (222) is connected through a wireline connection (218) to a first data communications network (100), and a second one of the ports (224) is connected through another wireline connection (220) to a second data communications network (102). Three additional ports (234, 236, 238) are connected to bump-in-the-wire data processing applications (240). The applications (240) typically are installed and executing on separate computers, often in a blade form factor, and coupled to the switch ports through level-2 links (244, 246, 238). The applications (240) are labeled $A_1 \ldots A_n$ to denote that, although there are only three ports connected to two application in this example, in fact apparatus that carries out packet steering for bump-in-the-wire processing according to embodiments of the present invention can include any number of connections to any number of bump-in-the-wire applications. Each application (240) is associated with a unique, link-level identifier (242), designated in this example as $ID_1 \ldots ID_n$, where $ID_1$ is the link-level identifier for application $A_1$, $ID_2$ is the link-level identifier for application $A_2$, and so on through application $A_n$ and its link-level identifier $ID_n$. Examples of link-level identifiers include a Media Access Control ('MAC') address and a World Wide Name ('WWN') or World Wide Identifier ('WWID'). MAC addresses are used generally in Ethernet addressing, and WWNs or WWIDs are used in other contexts including, for example, Fibre Channel addressing and in Serial Attached SCSI storage networks.

In this example, each port (222, 224, 234, 236, 238) is capable of functioning as an ingress port or an egress port for data communications among the networks and the applications. That is, data traffic through the switch is generally bidirectional. The terms 'first' and 'second' are sometimes to refer to a port or to a network in this specification, but such designations are only for convenience of explanation. Data traffic in this example moves both from network (100) in through port (222) through the switch (150) through one or more applications (240) out through port (224) to network (102)—as well as from network (102) in through port (224) through the switch (150) through one or more applications (240) out through port (222) to network (100).

In the example of FIG. 1, the switch also includes data storage (172) operatively coupled to the processor (156). The data storage has stored within it rules (232) governing the steering of data communications among the ports of the switch, where each rule includes an association of an ingress port and an egress port. The data storage (232) can be implemented in a number of forms as will occur to those of skill in the art, including, for example, a microdrive or electrically erasable programmable read-only memory ('EEPROM' or 'flash'). Whether a port is an ingress port or an egress port is determined by the port's usage for a given packet. If a packet enters the switch through a port, that port is taken as the packet's ingress port for purposes of current rule execution. If a packet is to exit the switch through a port, that port is taken as the packet's egress port for purposes of current rule execution. The rules can associate ingress ports and egress ports in a variety of ways as will occur to those of skill in the art, including, for example, a sequence of C-style structs, a linked list, an array with at least two dimensions, and so on. The data storage is preferably non-volatile and can be configured with the rules by a system administrator or a manufacturer. One form of data storage for the rules, possibly somewhat preferred because of its response speed, is a content addressable memory or 'CAM,' in which the ingress ports and egress port are associated by treating an ingress port number as an address and treating a corresponding egress port number as memory content to be looked up on the basis of an ingress port number. A lookup of a rule in the CAM then is carried out by placing an ingress port number, optionally along with additional information as needed, on an input of the CAM and reading an egress port number from the output of the CAM.

The example switch (150) of FIG. 1 also includes a packet steering module (130), a module of automated computing machinery configured to carry out packet steering data for transparent, bump-in-the-wire processing among multiple data processing applications according to embodiments of the present invention. The packet steering module (130) may be implemented as, for example, a control program stored in random access memory ('RAM') (132) or stored in a programmable read only memory ('PROM') ('131'). Or the packet steering module (130) may be implemented as a complex programmable logic device ('CPLD') (133), a field programmable gate array ('134'), or as an application specific integrated circuit ('ASIC') (135).

The switch (150) in this example steers packets under control of the packet steering module (130) according to embodiments of the present invention by receiving in the switch through an ingress port (222) from the first network (100) data communications packets (136) directed to the second network (224). Each such packet contains a source network address (228) that identifies the source of the packet in the first network and a destination network address (230) that identifies the destination of the packet in the second network. The source of the packet in the first network typically is one of the automated devices connected to the first network, such as, for example, desktop computer (202) or laptop computer (204). Similarly, the destination of the packet in the second network is one of the devices connected to the second network, such as, for example, server (206) or mobile phone (208). The network addresses are OSI layer-3 addresses; in the Internet Protocol, these would be IP addresses, for example. In an IP/Ethernet network, typical of prior art, for example, either a network address or a MAC address would be used to carry out all routing and steering of packets. In this example, however, the switch steers each packet among the applications (240) and through an egress port (224) to the second network (102), with the steering carried out only in accordance with the rules (232), using neither the source network address (228) of the packet, the destination network address (230) of the packet, nor the link-level identifier (242) of any application. Thus the steering among the bump-in-the-wire applications is carried out with no requirement to modify the packets in any way and, in particular, with no requirement to modify any address information in any packet.

Figure 2:
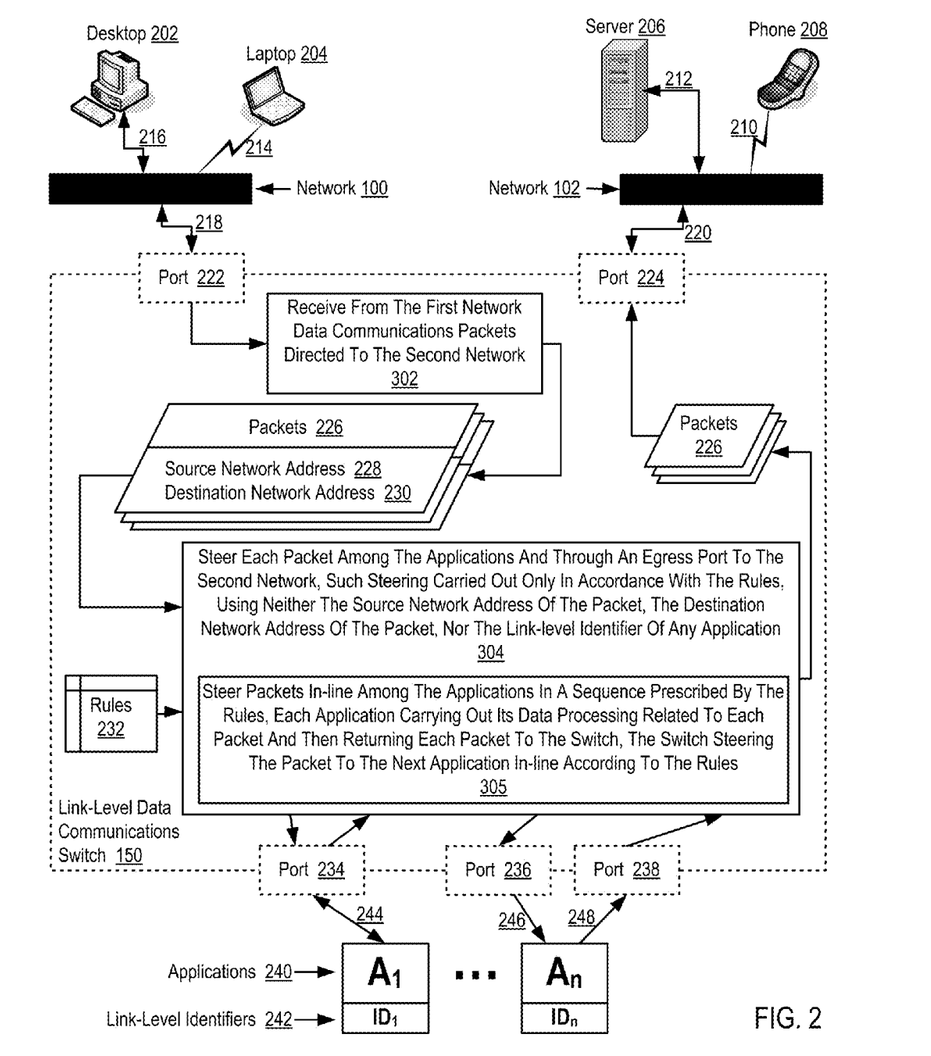
FIG. 2 sets forth a flow chart illustrating an example method of steering data communications packets for transparent, bump-in-the-wire processing among multiple data processing applications according to embodiments of the present invention.

For further explanation, FIG. 2 sets forth a flow chart illustrating an example method of steering data communications packets for transparent, bump-in-the-wire processing among multiple data processing applications according to embodiments of the present invention. The method of FIG. 2 is carried out in a link-level data communications switch (150) like the switch described above with reference to FIG. 1. The switch (150) includes a number of data communications ports (222, 224, 234, 236, 238), with one port (222) connected to a first data communications network (100) and another port (224) connected to a second data communications network (102), and with a number of additional ports (234, 236, 238) connected to bump-in-the-wire data processing applications (240). Each port is capable of functioning as an ingress port or an egress port for data communications among the networks and the applications, and each application is associated with a unique, link-level identifier (242) such as a MAC address, a WWID or a WWN. The switch has stored within it rules (232) governing the steering of data communications among the ports of the switch, with each rule composed of at least an association of an ingress port and an egress port.

The method of FIG. 2 includes receiving (302) in the switch (150) through an ingress port (222) from the first network (100) data communications packets (226) directed to the second network (102). Each packet contains a source network address (228) that identifies the source of the packet in the first network and a destination network address (230) that identifies the destination of the packet in the second network. The method of FIG. 2 also includes steering (304) each packet among the applications (240) and through an egress port (224) to the second network, such steering carried out only in accordance with the rules (232), using neither the source network address (228) of the packet, the destination network address (230) of the packet, nor the link-level identifier (242) of any application. Also in the method of FIG. 2, steering (304) each packet among the applications includes steering (305) packets in-line among the applications in a sequence prescribed by the rules, where each application carries out its data processing related to each packet and then returns each packet to the switch. The switch then steers the packet to the next application in-line according to the rules.

Rules composed of associations of ingress ports and egress ports may be implemented, for example, as records in a table, as shown in example Table 1 below.

TABLE 1

Rules Associating Ingress and Egress Ports

| Ingress Port Number | Egress Port Number |
| --- | --- |
| 222 | 234 |
| 234 | 236 |
| 238 | 224 |

Each record in Table 1 represents a packet steering rule that associates an ingress port with an egress port. The rules of Table 1 govern the steering of a packet from a first network (100) through applications $A_1$ and $A_n$ and through a egress port to a second network (102). Packet steering according to the first rule steers a packet ingressing the switch from network (100) through port number (222) to an egress through port (234) for processing by application $A_1$. The same packet, having completed processing in application $A_1$, ingresses the switch through port (234), and the switch directs that packet according to the second rule to egress through port number (236) for processing by application $A_n$. The packet's next ingress is through port (238), and the packet is now steered according to the third rule to egress through port (224) to the second network (102). Although all the ports are technically capable of operating in both directions, according to the rules of Table 1, port 236 is used only for egress to application $A_n$, and port (238) is used only for ingress from application $A_n$.

Figure 3:
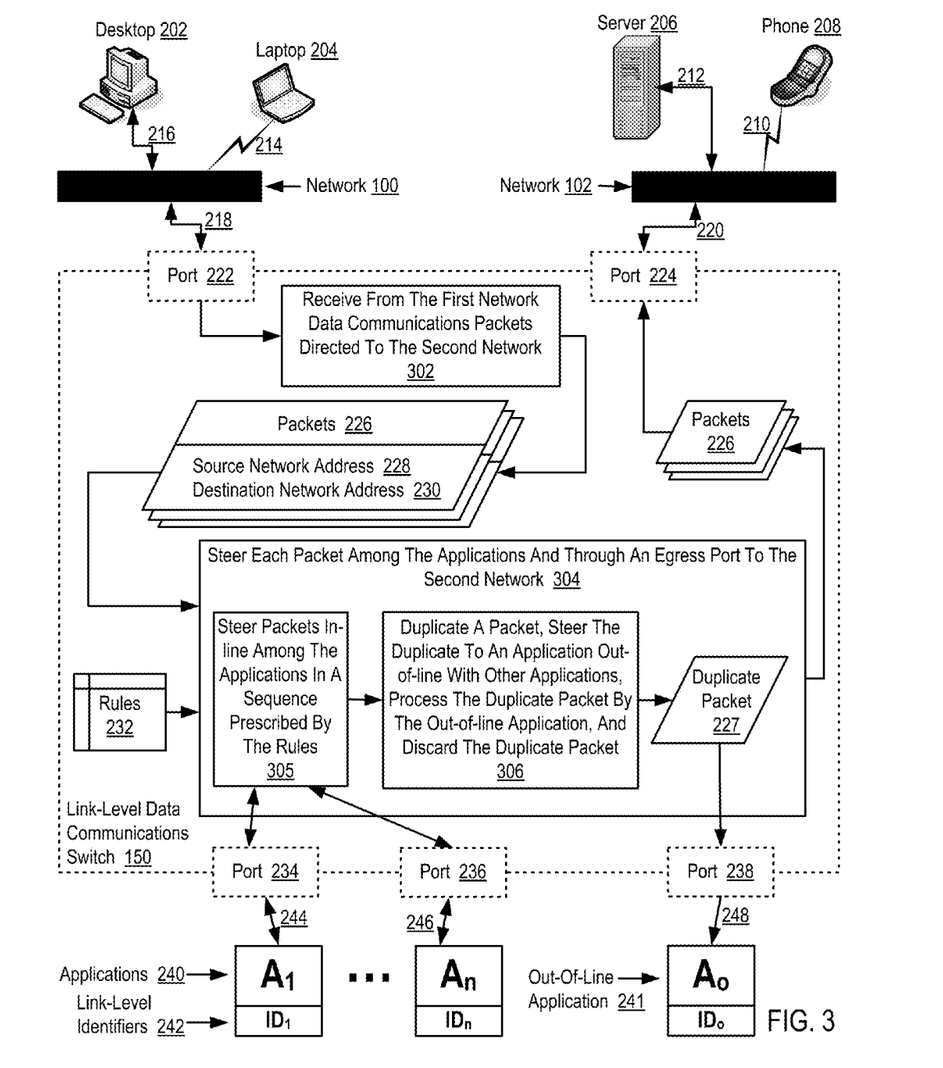
FIGS. 3-5 set forth additional flow charts illustrating further example methods of steering data communications packets for transparent, bump-in-the-wire processing among multiple data processing applications according to embodiments of the present invention.

For further explanation, FIG. 3 sets forth a flow chart illustrating a further example method of steering data communications packets for transparent, bump-in-the-wire processing among multiple data processing applications according to embodiments of the present invention. The method of FIG. 3, like the method of FIG. 2, is carried out in a link-level data communications switch (150) like the switch described above with reference to FIG. 1. The switch (150) includes a number of data communications ports (222, 224, 234, 236, 238) through which the switch is connected to two networks (100, 102) and several bump-in-the-wire data processing applications (240); each application is associated with a unique, link-level identifier (242). The switch contains rules (232) governing the steering of data communications among the ports of the switch.

Like the method of FIG. 2, the method of FIG. 3 includes receiving (302) in the switch (150) through an ingress port (222) from the first network (100) data communications packets (226) directed to the second network (102). Each packet contains a source network address (228) that identifies the source of the packet in the first network and a destination network address (230) that identifies the destination of the packet in the second network. The method of FIG. 3 also includes steering (302) each packet among the applications (240) and through an egress port (226) to the second network, with the steering carried out only in accordance with the rules (232), using neither the source network address (228) of the packet, the destination network address (230) of the packet, nor the link-level identifier (242) of any application.

Also like the method of FIG. 2, in the method of FIG. 3, steering (304) each packet among the applications includes steering (305) packets in-line among the applications in a sequence prescribed by the rules. Unlike the method of FIG. 2, however, in the method of FIG. 3, steering (304) each packet among the applications also includes duplicating (306) at least one packet (227), steering the duplicate packet to an application (241) out-of-line with other applications (240), processing the duplicate packet (227) by the out-of-line application (here represented as application $A_o$), and, after processing the duplicate packet, discarding the duplicate packet by the out-of-line application. In effect, the duplicate packet represents a kind of fork or mirror of a data communication stream. Rules governing such a duplicate, fork, or mirror are illustrated by example Table 2.

TABLE 2

Rules Effecting Packet Duplication

| Duplicate | Ingress Port Number | Egress Port Number |
| --- | --- | --- |
| No | 222 | 234 |
| No | 234 | 236 |
| Yes | 236 | 224 |
| No | 236 | 238 |

Each record in Table 2 represents a packet steering rule that associates an ingress port with an egress port. In addition, each record of Table 2 contains, in a column labeled "Duplicate," a Boolean indication whether a packet is to be duplicated. When a packet is duplicated, the switch operated by a packet steering module (130 on FIG. 1) looks for an additional rule for the same ingress port governing the steering of the duplicate packet. The rules of Table 2 govern the steering of a packet from a first network (100) through applications $A_1$ and $A_n$ and through a egress port to a second network (102), with a duplication of the packet that is steered out to application $A_o$. Packet steering according to the first rule steers a packet ingressing the switch from network (100) through port number 222 to an egress through port 234 for processing by application $A_1$. The same packet, having completed processing in application $A_1$, ingresses the switch through port 234, and the switch directs that packet according to the second rule to egress through port number 236 for processing by application $A_n$. The packet's next ingress is back through port 236, but the third rule, governing ingress through port 236 a Boolean indication "Yes" that the packet is to be duplicated, to the switch now duplicates the packet and steers the original packet according to the third rule to egress through port 224 to the second network (102). The switch (160) then looks for another ingress rule for port 236, taking this fourth rule as a rule governing the steering of the duplicate packet (227), which in this case steers the duplicate packet out through port (238) to out-of-line application $A_o$. Out-of-line application $A_o$ processes the packet and discards it—so that there is no rule in the table governing further steering of the duplicate packet.

Figure 4:
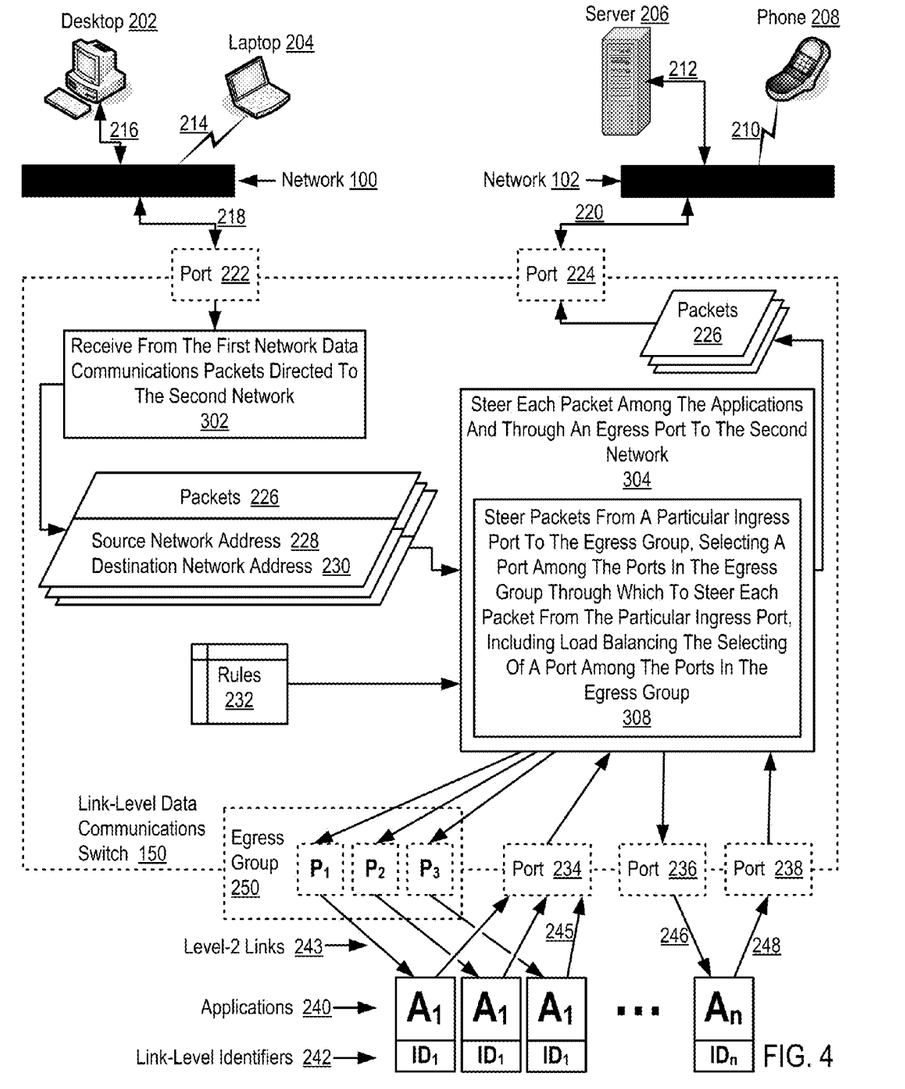

For further explanation, FIG. 4 sets forth a flow chart illustrating a further example method of steering data communications packets for transparent, bump-in-the-wire processing among multiple data processing applications according to embodiments of the present invention. The method of FIG. 4, like the method of FIG. 2, is carried out in a link-level data communications switch (150) like the switch described above with reference to FIG. 1. The switch (150) includes a number of data communications ports (222, 224, 234, 236, 238) through which the switch is connected to two networks (100, 102) and several bump-in-the-wire data processing applications (240); each application is associated with a unique, link-level identifier (242). The switch contains rules (232) governing the steering of data communications among the ports of the switch.

Like the method of FIG. 2, the method of FIG. 4 includes receiving (302) in the switch (150) through an ingress port (222) from the first network (100) data communications packets (226) directed to the second network (102). Each packet contains a source network address (228) that identifies the source of the packet in the first network and a destination network address (230) that identifies the destination of the packet in the second network. The method of FIG. 4, also like the method of FIG. 2, includes steering (302) each packet among the applications (240) and through an egress port (224) to the second network, with the steering carried out only in accordance with the rules (232), using neither the source network address (228) of the packet, the destination network address (230) of the packet, nor the link-level identifier (242) of any application.

Unlike the method of FIG. 2, however, in the method of FIG. 4, at least one group of ports is specified as an egress group (250). In this example, ports designated $P_1$, $P_2$, and $P_3$ are specified as an egress group, and each port in the egress group is connected to a separate instance of a same application. In this example, bump-in-the-wire application $A_1$ is instantiated three times and ports $P_1$, $P_2$, and $P_3$ are each connected through level-2 links (243) to a separate instance of application $A_1$. A group of ports may be specified as an egress group as illustrated by Table 3.

TABLE 3

| Egress Groups | |
|---|---|
| Egress Group ID | Port ID |
| 250 | $P_1$ |
| 250 | $P_2$ |
| 250 | $P_3$ |

Each record in Table 3 specifies a particular port as a member of the egress group identified by reference number (250). For ease of explanation, only one egress group is illustrated here, containing only three ports, but readers will recognize that practical egress groups can be specified in various numbers and can contain various numbers of ports.

In the example of FIG. 4, at least one of the rules (232) associates a particular ingress port with the egress group (250). Associating an ingress port with an egress group can be implemented, for example, as illustrated by Table 4.

TABLE 4

| Rules Associating Ingress and Egress Ports With At Least One Rule Associating An Ingress Port And An Egress Group | | |
|---|---|---|
| Ingress Port Number | Egress Port Number | Egress Group ID |
| 222 | | 250 |
| 234 | 236 | |
| 238 | 224 | |

Each record in Table 4 represents a packet steering rule that associates an ingress port with either an egress port or an egress group. The rules of Table 4 govern the steering of a packet from a first network (100) through applications $A_1$ and $A_n$ and through a egress port to a second network (102). Packet steering according to the first rule steers a packet ingressing the switch from network (100) to an egress through one of the ports in egress group (250) for processing by one of the instances of application $A_1$. The same packet, having completed processing in one of the instances of application $A_1$, ingresses the switch through port (234), and the switch directs that packet according to the second rule to egress through port number (236) for processing by application $A_n$. The packet's next ingress is through port 238, and the packet is now steered according to the third rule to egress through port 224 to the second network (102).

In the method of FIG. 4, steering (304) packets among the applications also includes steering (308) packets from a particular ingress port (222) to the egress group (250), including selecting a port among the ports in the egress group through which to steer each packet from the particular ingress port and load balancing the selecting of a port among the ports in the egress group. The switch knows of the need to select a port because when the switch, or the switch's packet steering module (130 on FIG. 1), looks up the rule for the ingress port (222), the lookup return an identifier of an egress group (250). The switch can then select a port in the egress group and load balance the selection by, for example, a sequential round-robin selection process among ports $P_1$, $P_2$, and $P_3$—tracking the most recently selected port in the group and always selecting the next port in the group for the next packet that arrives through port (222).

Figure 5:
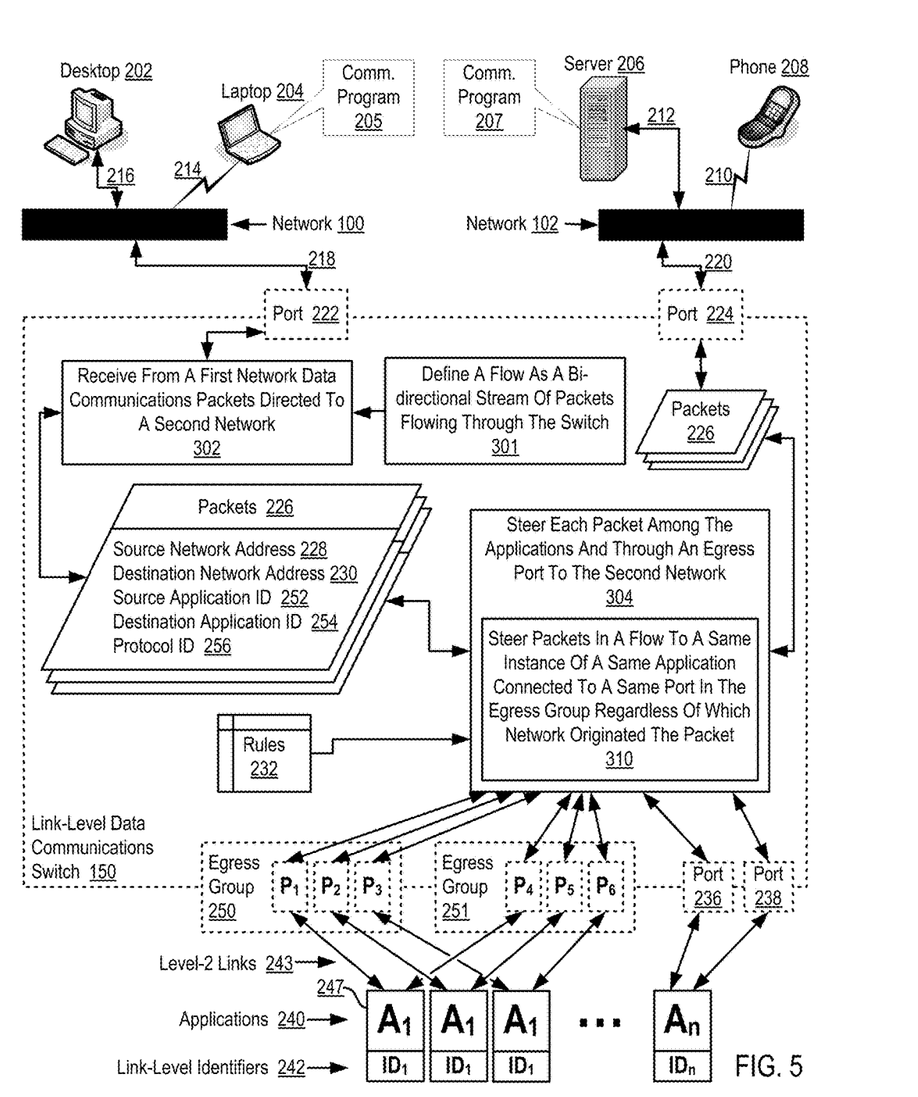

For further explanation, FIG. 5 sets forth a flow chart illustrating a further example method of steering data communications packets for transparent, bump-in-the-wire processing among multiple data processing applications according to embodiments of the present invention. The method of FIG. 5, like the method of FIG. 2, is carried out in a link-level data communications switch (150) like the switch described above with reference to FIG. 1. The switch (150) includes a number of data communications ports (222, 224, 234, 236, 238) through which the switch is connected to two networks (100, 102) and several bump-in-the-wire data processing applications (240); each application is associated with a unique, link-level identifier (242). The switch contains rules (232) governing the steering of data communications among the ports of the switch.

Like the method of FIG. 2, the method of FIG. 5 includes receiving (302) in the switch (150) through an ingress port (222) from the first network (100) data communications packets (226) directed to the second network (102). Each packet contains a source network address (228) that identifies the source of the packet in the first network and a destination network address (230) that identifies the destination of the packet in the second network. The method of FIG. 5, also like the method of FIG. 2, includes steering (302) each packet among the applications (240) and through an egress port (224) to the second network, with the steering carried out only in accordance with the rules (232), using neither the source network address (228) of the packet, the destination network address (230) of the packet, nor the link-level identifier (242) of any application.

In the method of FIG. 5, two groups of ports are specified as egress groups (250, 251). Each port in egress group (250), that is, ports $P_1$, $P_2$, and $P_3$, is connected to a separate instance of a same application, in this case, bump-in-the-wire application $A_1$, which is instantiated three times with ports $P_1$, $P_2$, and $P_3$ each connected through level-2 links (243) to a separate instance of application $A_1$. Each port in egress group (251), that is, ports $P_4$, $P_5$, and $P_6$, is similarly connected to a separate instance of application $A_1$. A group of ports may be specified as an egress group as illustrated and described with reference to Table 3 above. In the example of FIG. 5, rules in Table 5 below associate an ingress port with each egress group.

In addition to the source network address (228) and the destination network address (230), each packet in the example of FIG. 5 also includes a source application identifier (252) of an application located at the packet's source address in the first network, a destination application identifier (254) of an application located at the packet's destination address in the second network, and a protocol identifier (256) for the packet. The protocol identifier (256) identifies the protocol that is in effect using the packet, that is, the OSI level-4 protocol whose payload is encapsulated in a level-3 packet that is in turn encapsulated in the level-2 packet that arrives in the switch. In the internet setting, the most common contents of the protocol identifier are identifiers for the Transmission Control Protocol ('TCP') and the User Datagram Protocol ('UDP'). The source application identifier (252) and the destination application identifier (254) are encoded identifiers for data structures at the endpoints of communication. In effect, they identify for the computers at the endpoints which program in the computer sent a packet and to which program the packet is to be delivered. In the context of the internet, especially for TCP and UDP, such an endpoint is referred to as a 'port,' and the identifier is known as a 'port number.' Examples of well-known port numbers in the internet context include port number 20 for the File Transfer Protocol, port number 23 for Telnet, port number 25 for email in the Simple Mail Transfer Protocol, port number 110 for email in the Post Office Protocol, port number 80 for web pages in the Hypertext Transfer Protocol, and so on. The term 'port' in this context possibly risks confusion with references to a hardware port on a switch. Generally therefore in this specification, such a communications endpoint identifier is referred to as an application identifier, source or destination, rather than a port.

The method of FIG. 5 includes defining (301) a flow as a bi-directional stream of packets flowing through the switch between a data communications program (205) running on a computer in the first network and a data communications program (207) running on a computer in the second network. The program (205) in the first network can be, for example, a web browser sending an HTTP Request to a program (207) in the second network represented by a web server running on server (206), where the program (207) in the second network would then return to the program (205) in the first network a stream of packets forming an HTTP Response making up a web page. A similar bi-directional stream would be implemented by a email client in the first network requesting email from an email server in the second network. And so on.

Defining (301) a flow as a bi-directional stream of packets flowing through the switch between a data communications program (205) running on a computer in the first network and a data communications program (207) running on a computer in the second network can be carried out by use of the information in the packet—with no requirement to modify in any way the information in the packet. Defining (301) a flow may be carried out, for example, by use of the source network address (228) and the destination network address (230) in combination with the source application identifier (252), the destination application identifier (254), and the protocol identifier (256) for each packet by symmetrically hashing these values for each packet and specifying any packet whose contents yield the same hash value as a packet in the same flow. The hash is said to be symmetric so that the contents of any packet travelling between the same two endpoints would yield the same hash value regardless of the direction in which the packet is travelling. In bi-directional travel, the packet contents for source application identifier (252), destination application identifier (254), and protocol (256) may remain the same, but, although the endpoint addresses do not change in a flow between the same two programs (205, 207), still the values in the source network address (228) and the destination network address (230) in the packets are reversed across the two directions of travel. A symmetric hash, as the term is used here, is a function that yields the same hash value regardless of the order in which its inputs are taken. Consider an example in which a packet travelling from the first network ('100') through the switch ('150') to the second network ('102') contains the following values:

source network address: 1.2.3.4
destination network address: 5.6.7.8
source application identifier: 80
destination application identifier: 80
protocol: 06

And in travelling from the second network to the first network, another packet in the same flow contains the following values:

source network address: 5.6.7.8
destination network address: 1.2.3.4
source application identifier: 80
destination application identifier: 80
protocol: 06

With a symmetric hash, both sets of values yield the same hash value, indicating that both of these packets are part of the same flow and therefore to be steered through the applications in the same way.

In the method of FIG. 5, steering (304) packets among the applications includes steering (310) packets in a flow to a same instance of a same application regardless of which network originated the packet. Such packet steering can be implemented, for example, as illustrated by Table 5.

TABLE 5

Rules Associating Ingress and Egress Ports
With At Least One Rule Associating An
Ingress Port And An Egress Group

| Flow ID (Hash) | Originating Network | Ingress Port | Egress Port | Egress Group |
|---|---|---|---|---|
| 437 | 100 | 222 | $P_1$ | 250 |
| 437 | 100 | | $P_4$ | 236 |

TABLE 5-continued

Rules Associating Ingress and Egress Ports
With At Least One Rule Associating An
Ingress Port And An Egress Group

| Flow ID (Hash) | Originating Network | Ingress Port | Egress Port | Egress Group |
|---|---|---|---|---|
| 437 | 100 | 238 | 224 | |
| 437 | 102 | 224 | 238 | |
| 437 | 102 | 236 | $P_4$ | 251 |
| 437 | 102 | $P_1$ | 222 | |

Each record in Table 5 represents a packet steering rule for a flow that associates an ingress port with a specific egress port even when the egress port is a member of an egress group. The flow is specified by the same hash value, '437,' for selected contents of packets travelling between the same two programs (205, 207). The rules of Table 5 govern the steering of a packet from a first network (100) through applications $A_1$ and $A_n$ and through an egress port (224) to a second network (102)—and also steer packets in the other direction from the second network (102) through applications $A_n$ and $A_1$ and out through egress port (222).

The first three rules in Table 5 govern the steering of packets traveling in the direction from network (100) toward network (102). When a packet enters the switch through port (222), network (100) is taken as the originating network to indicate that for this packet the direction of travel is from the network (100) towards network (102). The rule for ingress through port (222) includes an indication that egress for the packet is through an egress group (250) that connects several instances of application $A_1$. Because the packet is part of a flow, however, the rule for ingress through port (222) also includes a specific designation of port $P_1$ so that all the packets in this flow are steered to the same instance of application $A_1$ regardless which network originates a packet, that is, regardless of the direction of travel of any particular packet. After processing the packet, the instance of application $A_1$ returns the packet to the switch through port $P_4$, and the switch steers the packet according to the second rule in Table 5 to egress through port (236) for processing by application $A_n$. After processing by application $A_n$, the packet arrives back in the switch through port (238) and the switch steers the packet according to the third rule in Table 5 to egress through port (224) toward network (102).

The last three rules in Table 5 govern the steering of packets traveling in the direction from network (102) toward network (100). When a packet enters the switch through port (224), network (102) is taken as the originating network to indicate that for this packet the direction of travel is from the network (102) towards network (100), and the switch steers the packet according to the fourth rule in Table 5 to an egress through port (238) for processing by application $A_n$. After processing by application $A_n$, the packet arrives back in the switch through port (236), and the switch steers the packet according to the fifth rule in Table 5 to egress through port $P_4$ toward network (102). The rule for ingress through port (236) includes an indication that egress for the packet is through an egress group (251) that connects several instances of application $A_1$. Because the packet is part of a flow, however, the rule for ingress through port (236) also includes a specific designation of port $P_4$ so that all the packets in this flow, flow 437, are steered to the same instance of application $A_1$ regardless which network originates a packet, that is, regardless of the direction of travel of any particular packet. After processing the packet, the instance of application $A_1$ returns the packet to the switch through port $P_1$, and the switch steers the packet according to the last rule in Table 5 to egress through port (222) toward network (100).

Steering all packets in a flow to the same instance of a bump-in-a-wire application allows the application to maintain state information on the flow as a whole—a characteristic that would be lost, if, for example, the switch round-robin load balanced a flow and spread its packets across all the instances of an application connected through an egress group. Then no single instance of the application could maintain information characterizing the flow as a whole. Readers will recognize also that, although packets traveling in different directions travel to and from an instance of application $A_1$ through different ports, $P_1$ and $P_4$, all packets in a flow nevertheless are processed by the same instance (247) of application $A_1$. The fact that packets traveling in one direction arrive through port $P_1$ and packets traveling in the other direction arrive through port $P_4$, allows application $A_1$ to track and use the identity of the originating network in processing packets as needed. The same information regarding direction of travel is available also to application $A_n$, because packets traveling in one direction arrive at application $A_n$ only through port (236), and packets traveling in the other direction arrive at application $A_n$ only through port (238).

Finally, readers will recognize that the column for Originating Network is presented in Table 5 only for convenience of explanation. In carrying out the method of FIG. 5, the switch (150), or the packet steering module (130 on FIG. 1) that controls the switch, can select a rule governing packet steering for a flow, and therefore an egress port, based only on a combination of the identity of an ingress port through which a packet arrives in the switch and the identity of a flow.

Exemplary embodiments of the present invention are described largely in the context of a fully functional computer system for steering data communications packets for transparent, bump-in-the-wire processing among multiple data processing applications. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of steering data communications packets for transparent, bump-in-the-wire processing among multiple data processing applications, the method comprising:

carrying out bump-in-the-wire processing among the multiple data processing applications in a link-level data communications switch, the switch comprising a data communications processor operatively coupled to a plurality of data communications ports, a first one of the ports connected to a first data communications network and a second one of the ports connected to a second data communications network, two or more additional ports connected to the data processing applications, each port capable of functioning as an ingress port or an egress port for data communications among the networks and the applications, each application associated with a unique, link-level identifier; the switch further comprising data storage operatively coupled to the processor, the data storage having stored within it rules governing the steering of data communications among the ports of the switch, each rule comprising an association of an ingress port and an egress port, including:

receiving in the switch through an ingress port from the first network data communications packets directed to the second network, each packet containing a source network address that identifies the source of the packet in the first network and a destination network address that identifies the destination of the packet in the second network; and steering by the switch each packet among the applications and through an egress port to the second network, such steering carried out only in accordance with the rules, using neither the source network address of the packet, the destination network address of the packet, nor the link-level identifier of any application.

2. The method of claim 1 wherein steering each packet among the applications further comprises steering packets in-line among the applications in a sequence prescribed by the rules, each application carrying out its data processing related to each packet and then returning each packet to the switch, the switch steering the packet to the next application in-line according to the rules.

3. The method of claim 1 wherein steering each packet among the applications further comprises:

steering packets in-line among the applications in a sequence prescribed by the rules; and duplicating at least one packet, steering the duplicate packet to an application out-of-line with other applications, processing the duplicate packet by the out-of-line application, and, after processing the duplicate packet, discarding the duplicate packet by the out-of-line application.

4. The method of claim 1 wherein:

at least one group of the ports is specified as an egress group, each port of the group connected to a separate instance of a same application, at least one rule associates a particular ingress port with the egress group, and steering packets among the applications further comprises steering packets from the particular ingress port to the egress group, including selecting a port among the ports in the egress group through which to steer each packet from the particular ingress port, including load balancing the selecting of a port among the ports in the egress group.

5. The method of claim 1 wherein:

at least one group of the ports is specified as an egress group, each port of the group connected to a separate instance of a same application, and at least one rule associates a particular ingress port with the egress group;

each packet further comprises a source application identifier of an application located at the packet's source address in the first network, a destination application identifier of an application located at the packet's destination address in the second network, and a protocol identifier for the packet;

the method further comprises defining a flow as a bi-directional stream of packets flowing through the switch between a data communications program running on a computer in the first network and a data communications program running on a computer in the second network; and steering packets among the applications further comprises steering packets in a flow to a same instance of a same application regardless of which network originated the packet.

6. Apparatus for steering data communications packets for transparent, bump-in-the-wire processing among multiple data processing applications, the apparatus comprising:

a link-level data communications switch, the switch comprising a data communications processor operatively coupled to a plurality of data communications ports, a first one of the ports connected to a first data communications network and a second one of the ports connected to a second data communications network, two or more additional ports connected to the data processing applications, each port capable of functioning as an ingress port or an egress port for data communications among the networks and the applications, each application associated with a unique, link-level identifier;

the switch further comprising data storage operatively coupled to the processor, the data storage having stored within it rules governing the steering of data communications among the ports of the switch, each rule comprising an association of an ingress port and an egress port;

the apparatus configured to carry out the steps of:

receiving in the switch through an ingress port from the first network data communications packets directed to the second network, each packet containing a source network address that identifies the source of the packet in the first network and a destination network address that identifies the destination of the packet in the second network; and steering by the switch each packet among the applications and through an egress port to the second network, such steering carried out only in accordance with the rules, using neither the source network address of the packet, the destination network address of the packet, nor the link-level identifier of any application.

7. The apparatus of claim 6 wherein steering each packet among the applications further comprises steering packets in-line among the applications in a sequence prescribed by the rules, each application carrying out its data processing related to each packet and then returning each packet to the switch, the switch steering the packet to the next application in-line according to the rules.

8. The apparatus of claim 6 wherein steering each packet among the applications further comprises:
- steering packets in-line among the applications in a sequence prescribed by the rules; and
- duplicating at least one packet, steering the duplicate packet to an application out-of-line with other applications, processing the duplicate packet by the out-of-line application, and, after processing the duplicate packet, discarding the duplicate packet by the out-of-line application.

9. The apparatus of claim 6 wherein:
- at least one group of the ports is specified as an egress group, each port of the group connected to a separate instance of a same application, at least one rule associates a particular ingress port with the egress group, and
- steering packets among the applications further comprises steering packets from the particular ingress port to the egress group, including selecting a port among the ports in the egress group through which to steer each packet from the particular ingress port, including load balancing the selecting of a port among the ports in the egress group.

10. The apparatus of claim 6 wherein:
- at least one group of the ports is specified as an egress group, each port of the group connected to a separate instance of a same application, and at least one rule associates a particular ingress port with the egress group;
- each packet further comprises a source application identifier of an application located at the packet's source address in the first network, a destination application identifier of an application located at the packet's destination address in the second network, and a protocol identifier for the packet;
- the apparatus is further configured to carry out the step of defining a flow as a bi-directional stream of packets flowing through the switch between a data communications program running on a computer in the first network and a data communications program running on a computer in the second network; and
- steering packets among the applications further comprises steering packets in a flow to a same instance of a same application regardless of which network originated the packet.

11. A computer program product for steering data communications packets through a link-level data communications switch for transparent, bump-in-the-wire processing among multiple data processing applications, the computer program product comprising:
- a non-transmission, recordable computer-readable medium embedded with the computer program which when executed by a communications processor performs the steps of:
- carrying out bump-in-the-wire processing among the multiple data processing applications in the link-level data communications switch, the switch comprising a data communications processor operatively coupled to a plurality of data communications ports, a first one of the ports connected to a first data communications network and a second one of the ports connected to a second data communications network, two or more additional ports connected to the data processing applications, each port capable of functioning as an ingress port or an egress port for data communications among the networks and the applications, each application associated with a unique, link-level identifier; the switch further comprising data storage operatively coupled to the processor, the data storage having stored within it rules governing the steering of data communications among the ports of the switch, each rule comprising an association of an ingress port and an egress port, including:
- receiving in the switch through an ingress port from the first network data communications packets directed to the second network, each packet containing a source network address that identifies the source of the packet in the first network and a destination network address that identifies the destination of the packet in the second network; and
- steering by the switch each packet among the applications and through an egress port to the second network, such steering carried out only in accordance with the rules, using neither the source network address of the packet, the destination network address of the packet, nor the link-level identifier of any application.

12. The computer program product of claim 11 wherein steering each packet among the applications further comprises steering packets in-line among the applications in a sequence prescribed by the rules, each application carrying out its data processing related to each packet and then returning each packet to the switch, the switch steering the packet to the next application in-line according to the rules.

13. The computer program product of claim 11 wherein steering each packet among the applications further comprises:
- steering packets in-line among the applications in a sequence prescribed by the rules; and
- duplicating at least one packet, steering the duplicate packet to an application out-of-line with other applications, processing the duplicate packet by the out-of-line application, and, after processing the duplicate packet, discarding the duplicate packet by the out-of-line application.

14. The computer program product of claim 11 wherein:
- at least one group of the ports is specified as an egress group, each port of the group connected to a separate instance of a same application, at least one rule associates a particular ingress port with the egress group, and
- steering packets among the applications further comprises steering packets from the particular ingress port to the egress group, including selecting a port among the ports in the egress group through which to steer each packet from the particular ingress port, including load balancing the selecting of a port among the ports in the egress group.

15. The computer program product of claim 11 wherein:
- at least one group of the ports is specified as an egress group, each port of the group connected to a separate instance of a same application, and at least one rule associates a particular ingress port with the egress group;
- each packet further comprises a source application identifier of an application located at the packet's source address in the first network, a destination application identifier of an application located at the packet's destination address in the second network, and a protocol identifier for the packet;
- the computer program instructions are further capable of causing the switch to carry out the step of defining a flow as a bi-directional stream of packets flowing through the switch between a data communications program running on a computer in the first network and a data communications program running on a computer in the second network; and
- steering packets among the applications further comprises steering packets in a flow to a same instance of a same application regardless of which network originated the packet.

* * * * *